United States Patent
Rahm et al.

(10) Patent No.: US 12,129,382 B2
(45) Date of Patent: Oct. 29, 2024

(54) EFFECT PIGMENT, PRODUCTION METHOD, VALUE DOCUMENT AND PRINTING INK

(71) Applicant: GIESECKE+DEVRIENT CURRENCY TECHNOLOGY GMBH, Munich (DE)

(72) Inventors: Michael Rahm, Bad Tolz (DE); Manfred Heim, Bad Tolz (DE); Raphael Dehmel, Neubeuern (DE); Winfried Hoffmuller, Bad Tolz (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 214 days.

(21) Appl. No.: 17/779,270

(22) PCT Filed: Nov. 20, 2020

(86) PCT No.: PCT/EP2020/025525
§ 371 (c)(1),
(2) Date: May 24, 2022

(87) PCT Pub. No.: WO2021/104666
PCT Pub. Date: Jun. 3, 2021

(65) Prior Publication Data
US 2022/0403177 A1    Dec. 22, 2022

(30) Foreign Application Priority Data
Nov. 27, 2019 (DE) ............................. 102019008289

(51) Int. Cl.
*C09C 1/00* (2006.01)
*B41M 3/14* (2006.01)
(Continued)

(52) U.S. Cl.
CPC ............ *C09C 1/0078* (2013.01); *B41M 3/14* (2013.01); *B41M 7/0072* (2013.01);
(Continued)

(58) Field of Classification Search
CPC ................................................... B41M 7/0072
See application file for complete search history.

(56) References Cited

U.S. PATENT DOCUMENTS

| 6,875,522 B2 | 4/2005 | Seto et al. |
| 8,129,021 B2 | 3/2012 | Kaupp et al. |

(Continued)

FOREIGN PATENT DOCUMENTS

| DE | 60210932 T2 | 12/2006 |
| WO | 2004024836 A2 | 3/2004 |

(Continued)

OTHER PUBLICATIONS

Machine translation of document N.*
International Search Report from corresponding PCT Application No. PCT/EP2020/025525, Mar. 9, 2021.

*Primary Examiner* — Austin Murata
(74) *Attorney, Agent, or Firm* — Workman Nydegger

(57) ABSTRACT

A platelet-shaped magnetic effect pigment is provided for use in a printing ink, and includes a layer construction with a magnetic layer and at least one optical functional layer, such that the magnetic layer is based on a magnetic material having a column-shaped nanostructure and the magnetic columns respectively have a largely uniform preferential magnetic direction deviating from the platelet plane.

22 Claims, 2 Drawing Sheets

(51) Int. Cl.
  *B41M 7/00* (2006.01)
  *B42D 25/369* (2014.01)
  *C09D 11/037* (2014.01)
  *C09D 11/101* (2014.01)
  *C09D 11/50* (2014.01)
  *H01F 1/055* (2006.01)
  *B42D 25/23* (2014.01)
  *B42D 25/29* (2014.01)

(52) U.S. Cl.
  CPC .......... *B42D 25/369* (2014.10); *C09C 1/0021* (2013.01); *C09D 11/037* (2013.01); *C09D 11/101* (2013.01); *C09D 11/50* (2013.01); *H01F 1/0551* (2013.01); *B42D 25/23* (2014.10); *B42D 25/29* (2014.10); *C01P 2006/42* (2013.01)

(56) References Cited

U.S. PATENT DOCUMENTS

| | | |
|---|---|---|
| 2003/0170471 A1 | 9/2003 | Seto et al. |
| 2005/0123755 A1* | 6/2005 | Argoitia ................. G03H 1/028 |
| | | 428/402 |
| 2010/0298469 A1 | 11/2010 | Kaupp et al. |
| 2011/0008399 A1 | 1/2011 | Bugnon et al. |
| 2022/0171954 A1* | 6/2022 | Dorier .............. G06K 19/06028 |

FOREIGN PATENT DOCUMENTS

| | | |
|---|---|---|
| WO | 2009030293 A2 | 3/2009 |
| WO | WO 2019/233625 * | 12/2019 |

* cited by examiner

EFFECT PIGMENT, PRODUCTION METHOD, VALUE DOCUMENT AND PRINTING INK

BACKGROUND

The invention relates to a platelet-shaped magnetic effect pigment for use in a printing ink, comprising a layer construction with a magnetic layer and at least one optical functional layer, wherein the magnetic layer is based on a magnetic material having a column-shaped nanostructure and the magnetic columns respectively have a largely uniform preferential magnetic direction deviating from the platelet plane. The invention further relates to a method for manufacturing the platelet-shaped magnetic effect pigment, a printing ink containing the effect pigments and a value document printed with the effect pigments.

Data carriers, such as value documents or identification documents, or other objects of value, such as branded articles, are often provided for safeguarding purposes with security elements which permit a verification of the authenticity of the data carriers and which at the same time serve as protection from unauthorized reproduction. An important role in safeguarding the authentication is played by security elements with viewing angle-dependent effects because these cannot be reproduced even with the most modern copiers. The security elements are equipped here with optically variable elements which convey a different pictorial impression to the viewer from different viewing angles, showing for example a different color impression or brightness impression and/or a different graphic motif, depending on the viewing angle.

Thin-film systems which produce a viewing angle-dependent color impression for the viewer by means of interference are known in the prior art. This optical effect can serve as an optically variable security element. A large-area thin-film system can be crushed by means of various techniques. The size of the resulting flakes or platelets can be as small as a few micrometers laterally, but the size usually ranges in a region from 2 μm to 100 μm. The vertical construction of a platelet is given by the requirements of the interference layers and is normally as thin as possible, e.g. in a region from 200 nm to 800 nm. Such platelets are employed e.g. in an optically variable ink (so-called OVI® ink) which is used for providing a security element.

Further known is the possibility of applying the thin-film systems producing a color impression onto a ferromagnetic material. The pigment platelets thus have a magnetic moment. Magnetically orientable effect pigments are commercially available, e.g. under the trade name OVMI® of the SICPA company (the abbreviation OVMI stands for "optically variable magnetic ink"). The pigments typically have a platelet-shaped construction and are present in the form of a layered composite which often includes two layers of optical effect layers and a magnetic layer embedded in between. With regard to the optical effect layers, metallically mirroring layers as well as color-shifting layer systems, e.g. with an absorber/dielectric/reflector construction, can be considered. The embedded magnetic layer is normally invisible, but is required for the alignment of the pigments.

In the prior art it is further known to utilize such color pigments having a magnetic moment for providing optically variable security elements. For this purpose, the pigments are incorporated into a transparent binding agent. By means of an external magnetic field the alignment of the pigments can be influenced immediately after the printing on a printing stock. Then, the binding agent is cured, e.g. by means of UV radiation, in order to fix the alignments of the pigments. By skillfully setting the spatial course of the pigment alignments, it is possible to equip the printed substrate with optical kinetic effects. Since due to shape anisotropy the magnetization direction of the pigments extends preferably along the direction of the largest dimension of the pigments, the magnetic moment of the particles is aligned perpendicular to the normal vector of the thin films. If a magnetic field with a field strength with the formula symbol "H" is applied, the pigments are aligned such that their magnetic moments are as parallel as possible to the field vector.

As a consequence, the magnetic pigments can rotate about axes parallel to their magnetization, which are arranged perpendicular to the normal vector of the thin films. When using the magnetic pigments in a manner known in the prior art, it can be assumed that the alignment of the pigments in one direction is substantially uniform, while in another direction it is substantially randomly distributed. This leads to a widening of the light reflection and to a decreased brilliance and sharpness of the optically variable effect.

SUMMARY

The object of the present invention is to provide magnetic effect pigments which allow a more extensive control of spatial alignment, in order to thereby achieve a more attractive optical effect.

SUMMARY OF THE INVENTION 1. (First aspect of the invention) A platelet-shaped magnetic effect pigment for use in a printing ink, comprising a layer construction with a magnetic layer and at least one optical functional layer, wherein the magnetic layer is based on a magnetic material having a column-shaped nanostructure and the magnetic columns respectively have a largely uniform preferential magnetic direction deviating from the platelet plane.

2. (Preferred embodiment) The platelet-shaped magnetic effect pigment according to section 1, wherein the largely uniform preferential magnetic direction of the magnetic columns is aligned substantially perpendicular to the platelet plane of the effect pigment.

3. (Preferred embodiment) The platelet-shaped magnetic effect pigment according to section 1, wherein the largely uniform preferential magnetic direction of the magnetic columns is inclined towards the platelet plane and the angle of inclination, measured starting from the perpendicular to the platelet plane, is preferably in a region of 1° to 20°.

4. (Preferred embodiment) The platelet-shaped magnetic effect pigment according to any of sections 1 to 3, wherein the magnetic columns respectively have a size of less than 1000 nm, preferably less than 500 nm, further preferably less than 200 nm and particularly preferably less than 100 nm.

5. (Preferred embodiment) The platelet-shaped magnetic effect pigment according to any of sections 1 to 4, wherein the largely uniform preferential magnetic direction of the magnetic columns is a uniaxial magnetic anisotropy, preferably a uniaxial magnetic crystal anisotropy or a uniaxial magnetic shape anisotropy.

6. (Preferred embodiment) The platelet-shaped magnetic effect pigment according to section 5, wherein the material of the magnetic layer is selected from the group consisting of $BaFe_{12}O_{19}$, FePt, CoCrPt, CoPt, BiMn, $\alpha$-$Fe_2O_3$ and $Nd_2Fe_{14}B$ and in particular the largely uniform preferential magnetic direction of the magnetic columns is a uniaxial magnetic crystal anisotropy, or wherein the material of the magnetic layer is selected from the group consisting of iron, cobalt, nickel and an alloy of one or several of the aforementioned elements and in particular the largely uniform preferential magnetic direction of the magnetic columns is a uniaxial magnetic shape anisotropy.

7. (Preferred embodiment) The platelet-shaped magnetic effect pigment according to any of sections 1 to 6, wherein the column-shaped nanostructure of the magnetic material is obtainable by means of the glancing angle deposition (GLAD) technique or the oblique angle deposition (OAD) technique.

8. (Preferred embodiment) The platelet-shaped magnetic effect pigment according to any of sections 1 to 7, wherein the optical functional layer is a metallic layer, a color layer obtainable by printing technology, an interference layer construction based on a reflective layer, a dielectric layer and an absorbent layer, or a combination of two or several of the aforementioned elements, e.g. a color layer obtainable by printing technology and arranged above a metallic layer.

9. (Preferred embodiment) The platelet-shaped magnetic effect pigment according to any of sections 1 to 8, wherein the effect pigment has a sandwich-like layer construction and the magnetic layer as a central layer is provided both on the front side and on the back side with respectively one optical functional layer, wherein the two optical functional layers independently from each other are selected from a reflective metallic layer, a color layer obtainable by printing technology, an interference layer construction based on a reflective layer, a dielectric layer and an absorbent layer, or a combination of two or more of the aforementioned elements, e.g. a color layer obtainable by printing technology and arranged above a reflective metallic layer.

10. (Preferred embodiment) The platelet-shaped magnetic effect pigment according to section 9, wherein the effect pigment has an asymmetric layer construction with two optical functional layers differing from each other, preferably two optical functional layers differing from each other, which respectively are an interference layer construction based on a reflective layer, a dielectric layer and an absorbent layer and differ from each other in particular with regard to the material or the layer thickness of the dielectric layer, and the effect pigment has the following layer sequence: absorbent layer-dielectric layer-reflective layer-magnetic layer-reflective layer-dielectric layer-absorbent layer.

11. (Preferred embodiment) The platelet-shaped magnetic effect pigment according to section 9, wherein the effect pigment has a symmetric layer construction with two identical optical functional layers.

12. (Preferred embodiment) The platelet-shaped magnetic effect pigment according to section 11, wherein the effect pigment has a symmetric layer construction, wherein the magnetic layer as a central layer is provided both on the front side and on the back side with respectively one optical functional layer, wherein the two optical functional layers respectively are an interference layer construction based on a reflective layer, a dielectric layer and an absorbent layer, and the effect pigment has the following layer sequence: absorbent layer-dielectric layer-reflective layer-magnetic layer-reflective layer-dielectric layer-absorbent layer.

13. (Preferred embodiment) The platelet-shaped magnetic effect pigment according to section 8, wherein the optical functional layer is an interference layer construction based on a reflective layer, a dielectric layer and an absorbent layer and the effect pigment has the following layer sequence: absorbent layer-dielectric layer-reflective layer-dielectric layer-absorbent layer-magnetic layer.

14. (Preferred embodiment) The platelet-shaped magnetic effect pigment according to section 10, wherein the effect pigment has an asymmetric layer construction, wherein the magnetic layer, on the front side, is provided with an interference layer construction based on a reflective layer, a dielectric layer and an absorbent layer and the magnetic layer, on the back side, is provided with a reflective metallic layer, so that the effect pigment has the following layer sequence: absorbent layer-dielectric layer-reflective layer-magnetic layer-reflective metallic layer.

15. (Second aspect of the invention) A method for manufacturing a platelet-shaped magnetic effect pigment according to any of sections 1 to 14, comprising
   a) producing a magnetic layer on the basis of a magnetic material having a column-shaped nanostructure, the magnetic columns being formed with a largely uniform preferential magnetic direction deviating from the plane of the magnetic layer;
   b) producing a layer construction having the magnetic layer and at least one optical functional layer; and
   c) crushing the layer construction obtained in step b) into individual platelet-shaped magnetic effect pigments.

16. (Third aspect of the invention) A method for manufacturing a value document, comprising
   printing the value document substrate with a first printing ink containing platelet-shaped magnetic effect pigments according to any of sections 1 to 14 in a first region;
   aligning the platelet-shaped magnetic effect pigments in the first printing ink respectively printed in the first region by means of an external magnetic field;
   curing the first printing ink printed in the first region.

17. (Preferred embodiment) The method according to section 16, comprising
   printing the value document substrate with a first printing ink containing first platelet-shaped magnetic effect pigments according to any of sections 1 to 14 in a first region;
   printing the value document substrate with a second printing ink containing second platelet-shaped magnetic effect pigments according to any of sections 1 to 14 in a second region adjacent to the first region, the second effect pigments being visually different from the first effect pigments;
   aligning the platelet-shaped magnetic effect pigments in the first and/or the second printing ink printed in the first region and in the second region, respectively, by means of an external magnetic field;
   curing the first and/or the second printing ink printed in the first region and in the second region, respectively.

18. (Preferred embodiment) The method according to section 16, comprising
   printing the value document substrate with a first printing ink containing platelet-shaped magnetic effect pigments according to any of sections 1 to 14 in a first region;
   printing the value document substrate with a second printing ink containing conventional platelet-shaped magnetic effect pigments in a second region adjacent to the first region, the conventional platelet-shaped magnetic effect pigments having a preferential magnetic direction extending along the platelet plane;
   aligning the platelet-shaped magnetic effect pigments in the first and/or the second printing ink printed in the first region and in the second region, respectively, by means of an external magnetic field;

curing the first and/or the second printing ink printed in the first region and in the second region, respectively, so that the two regions have a clearly distinguishable appearance due to the different alignment of the two types of effect pigments.

19. (Fourth aspect of the invention) A value document obtainable by the method according to any of sections 16 to 18.

20. (Preferred embodiment) The value document according to section 19, wherein the value document is a bank note or an identification document.

21. (Fifth aspect of the invention) A printing ink comprising platelet-shaped magnetic effect pigments according to any of sections 1 to 14.

22. (Preferred embodiment) The printing ink according to section 21, wherein the printing ink comprises a binding agent, preferably a UV-curing binding agent, a binding agent curing by means of electron beams or a heat-curing binding agent.

DETAILED DESCRIPTION OF THE PREFERRED EMBODIMENTS

The platelet-shaped magnetic effect pigment according to the invention comprises a layer construction with a magnetic layer and at least one optical functional layer, the magnetic layer being based on a magnetic material having a column-shaped nanostructure and the magnetic columns respectively having a largely uniform preferential magnetic direction deviating from the platelet plane. Instead of the formulation "a preferential magnetic direction deviating from the platelet plane", the formulation "a preferential magnetic direction deviating from the perpendicular to the normal vector of the platelet" is also used herein. The formulation "largely uniform preferential direction" of the magnetic columns is to be understood in such a way that the individual magnetic columns of the effect pigment do not necessarily all have to point in exactly the same direction, but where applicable the individual magnetic columns (in particular narrowly) distributed around a mean value or average can be oriented on average along exactly one direction. The magnetic columns preferably possess a size of less than 1000 nm, further preferably less than 500 nm, still further preferably less than 200 nm and particularly preferably less than 100 nm. The size of the magnetic columns here is an average size and refers to the length of the column from one end to the opposite end. The largely uniform preferential magnetic direction of the magnetic columns is aligned preferably substantially perpendicular to the platelet plane of the effect pigment. According to a variant, the uniform preferential magnetic direction of the magnetic columns is inclined towards the platelet plane, the angle of inclination starting from the perpendicular to the platelet plane being preferably in a region of 1° to 20°. The phrase "the angle of inclination starting from the perpendicular to the platelet plane" is equivalent to the phrase "the angle of inclination starting from the normal of the platelet plane". It is preferred that the uniform preferential magnetic direction of the magnetic columns in the column-shaped nanostructure is a uniaxial magnetic anisotropy, in particular preferably a uniaxial magnetic crystal anisotropy or a uniaxial magnetic shape anisotropy. The underlying magnetic material is in particular a ferromagnetic or ferrimagnetic material. The underlying magnetic material may be selected e.g. from the group consisting of $BaFe_{12}O_{19}$ or barium ferrite, FePt, CoCrPt, CoPt, BiMn or bismanol, $\alpha\text{-}Fe_2O_3$ or hematite and (in particular tetragonal) $Nd_2Fe_{14}B$.

The production of platelet-shaped magnetic effect pigments with a magnetic moment perpendicular to the platelet plane requires the manufacture of a thin layer with a magnetic moment that is permanently perpendicular to the layer plane. Such a manufacture is a major technical challenge, in particular if in view of occupational health and safety one has to do without toxic substances, such as toxic transition metals. By means of the manufacturing method according to the invention, magnetic layers with a magnetic moment in particular perpendicular to the layer plane can be produced in an advantageous manner, starting from which advantageous platelet-shaped magnetic effect pigments with in particular a magnetic moment perpendicular to the platelet plane can be obtained. The idea of the invention is based on producing a magnetic material with a column-shaped nanostructure, the magnetic columns each having a largely uniform preferential magnetic direction. Instead of the term "column", the term "needle" is also used herein. Such a column-shaped nanostructure is obtainable in particular by means of the glancing angle deposition (GLAD) technique or the oblique angle deposition (OAD) technique. These are sub-variants of the physical vapor deposition (PVD). Normally, in PVD processes the angles at which the gas particles impinge on the substrate to be vapor-deposited are broadly distributed around a mean value of about 90°, because in this way the highest possible proportion of condensation on the substrate is achieved. In the case of the GLAD or OAD technique, one chooses a narrow incidence angle distribution, the mean value of which sometimes deviates very significantly from the perpendicular incidence angle and may even extend approximately parallel to the substrate plane. It has been shown that in these configurations there often result special morphologies of the condensate. In a sense, forests are formed that consist of needle-shaped structures, the needle-shaped structures being arranged almost parallel, having high aspect ratios and being all at a certain angle to the substrate surface. If a ferromagnetic or a ferrimagnetic material is vaporized in this way, due to the shape anisotropy the magnetization direction will be parallel to the longest direction of extension of the needle structures. Thus, a magnetic film can be produced whose magnetization direction is at a fixed angle to the substrate plane. This angle can be influenced by the vapor deposition parameters and can e.g. also be almost perpendicular to the substrate plane.

Within the magnetic layer, the magnetic columns of the column-shaped nanostructure are preferably aligned such that the axis of easy magnetization (also called "easy axis" in the technical literature) is oriented perpendicular to the layer surface or layer plane.

Of course, based on the method described above, the resulting magnetic layer can in principle be provided with any arbitrary magnetization direction, in particular with a magnetization direction inclined towards the layer plane. A perpendicular magnetization or a magnetization lying in the layer plane are special cases here.

The magnetic layer obtained according to the manufacturing method described above can be combined on one side with an optical functional layer to produce an optically variable magnetic layer construction in this way. Alternatively, the magnetic layer can be combined on both sides with respectively one optical functional layer to produce an optically variable magnetic layer construction in this way.

A preferred layer construction is a symmetric layer construction with e.g. the layer sequence of absorbent layer-dielectric layer-reflective layer-magnetic layer-reflective layer-dielectric layer-absorbent layer. In this layer construction there is present on each side, with respect to the central magnetic layer, a color-tilting coating based on an absorber/dielectric/reflector thin-film system. The individual layers can e.g. be vapor-deposited in a vacuum or applied by so-called sputtering.

A further preferred layer construction has the layer sequence absorbent layer-dielectric layer-reflective layer-dielectric layer-absorbent layer-magnetic layer. In this layer construction, the reflectivity or the reflectance of the layer construction is influenced on one side by the presence of the magnetic layer. This influence is low when the magnetic columns are sufficiently small, e.g. have a size of less than 500 nm, preferably less than 200 nm and particularly preferably less than 100 nm.

Instead of an interference coating or a color-tilting thin-film system, as an optical functional layer there can further be used color layers available by printing technology, preferably translucent color layers, and/or pure reflective layers or metallic layers.

Instead of a symmetric layer construction, in which the color impression is independent of the viewing side, an asymmetric layer construction can also be used. Since according to the invention the magnetic moment is in particular perpendicular to the layer plane, the visibilities of the upper side and the lower side can be controlled in certain regions by means of external magnetic fields. In other words, platelet-shaped magnetic effect pigments can be utilized which have a fixed magnetic north side and south side but differ from each other with respect to the optical functional layer of these two sides. For example, optically variable magnetic effect pigments can be utilized which at the same time have different color-tilting effects on the upper side and on the lower side and whose magnetic moment is firmly defined relative to the upper side and lower side: north pole at the upper side with the first color-tilting effect and south pole at the lower side with the second color-tilting effect. If one prints these pigments on a transparent (value document) substrate and aligns them by an external magnetic field prior to the curing of the binding agent of the printing ink, from one side the viewer always sees the upper side of the pigments with the first color-tilting effect and from the other side the lower side of the pigments with the second color-tilting effect differing from the first color-tilting effect.

Furthermore, the magnetic layer of the effect pigment according to the invention can be combined, e.g. on one side or on both sides, with (in each case) an optical functional layer, the optical functional layer having a metallic layer, in particular a reflective metallic layer, and a glazing or translucent color layer. By means of a metallic layer arranged between the magnetic layer and the color layer, appealing optical effects can be achieved.

Furthermore, the magnetic layer of the effect pigment according to the invention can be combined, e.g. on one side or on both sides, with (in each case) an optical functional layer, the optical functional layer having a dielectric layer, e.g. $SiO_2$, and a metallic layer, in particular a reflective metallic layer, e.g. Al. By means of a combination of $SiO_2$ and Al e.g. golden color tones can be achieved even without a further absorbent layer and without a further color layer.

With reference to the manufacturing method for the magnetic layer described above, there is generally a risk that no optically smooth surface is present, so that the reflectivity of subsequent layers is impaired. This can be counteracted by not applying the further layers directly on the magnetic layer, but by first manufacturing them on another substrate, e.g. a foil such as a polyethylene terephthalate (PET) foil. In a further step, a flexible adhesive layer can be applied onto the magnetic layer, thereby levelling its rough surface, before the further layers are laminated or applied onto the magnetic layer. In an optional step, the aforementioned "another" substrate can be removed from the obtained construction (so-called transfer lamination).

Alternatively, the lack of an optically smooth surface on the magnetic layer can be remedied by applying a levelling, smoothing intermediate layer, e.g. a suitable intermediate lacquer.

With regard to the manufacturing of the pigments according to the invention, there are various possibilities. Common to all methods is that first a layer construction is produced above a carrier substrate, e.g. a carrier foil such as a polyethylene terephthalate (PET) foil, the layer construction having at least the magnetic layer and an optical functional layer. Subsequently, the layer construction is detached from the carrier substrate and, where applicable, crushed, e.g. by means of grinding, until particles with an adequate size distribution are obtained. For this purpose, it is advantageous to arrange a further layer between the carrier substrate and the layer construction, which can be removed in a controlled or selective manner, e.g. by dissolving it in a suitable solvent. Afterwards, the effect pigments obtained can be mixed with a UV-curing binding agent to form a (screen) printing ink. The effect pigments are in particular areal optically-variable pigments and preferably have a magnetic moment oriented perpendicular to the effect pigment plane, in accordance with the perpendicular orientation of the individual magnetic columns in the column-shaped nanostructure. In the step of applying the ink onto a printing stock such as a security paper or a security document substrate by printing technology, an external magnetic field is expediently applied and the ink is cured, e.g. by UV radiation or by the action of heat, so that the effect pigments become immobile.

Further, the invention relates to a method for manufacturing a value document, comprising
   printing the value document substrate with a first printing ink containing platelet-shaped magnetic effect pigments according to the invention, in a first region;
   aligning the platelet-shaped magnetic effect pigments in the first printing ink printed in the first region by means of an external magnetic field;
   curing the first printing ink printed in the first region.

Compared to prior art effect pigments with a magnetization extending in the plane of the effect pigment, the magnetic effect pigments according to the invention align themselves in an externally applied magnetic field such that the security feature resulting therefrom appears more brilliant and the light reflections look smoother because less light is scattered in deviating directions. This optical effect is particularly advantageous when the magnetization is perpendicular to the effect pigment plane.

A preferred method for manufacturing a value document comprises:
   printing the value document substrate with a first printing ink containing first platelet-shaped magnetic effect pigments according to the invention, in a first region;
   printing the value document substrate with a second printing ink containing second platelet-shaped magnetic effect pigments according to the invention in a second region adjacent to the first region, the second effect pigments being visually different from the first effect pigments;

aligning the platelet-shaped magnetic effect pigments in the first and/or the second printing ink printed in the first region and in the second region, respectively, by means of an external magnetic field;

curing the first and/or the second printing ink printed in the first region and in the second region, respectively.

A further preferred method for manufacturing a value document comprises:

printing the value document substrate with a first printing ink containing the platelet-shaped magnetic effect pigments according to the die invention, in a first region;

printing the value document substrate with a second printing ink containing conventional platelet-shaped magnetic effect pigments in a second region adjacent to the first region, the conventional platelet-shaped magnetic effect pigments having a preferential magnetic direction extending along the platelet plane;

aligning the platelet-shaped magnetic effect pigments in the first and/or the second printing ink printed in the first region and in the second region, respectively, by means of an external magnetic field;

curing the first and/or the second printing ink printed in the first region and in the second region, respectively, so that the two regions have a clearly distinguishable appearance due to the different alignment of the two types of effect pigments.

The striking leap in the appearance at the boundaries of the regions, which results from the different optically-variable properties of the regions with the various effect pigment types, represents an eye-catching and advantageous security feature.

Further advantages of the invention will be explained hereinafter with reference to the strongly simplified Figures, in whose representations a rendition that is true to scale and to proportion has been dispensed with in order to increase clarity.

BRIEF DESCRIPTION OF THE DRAWINGS

There are shown.

DETAILED DESCRIPTION OF VARIOUS EMBODIMENTS

Figure 6:
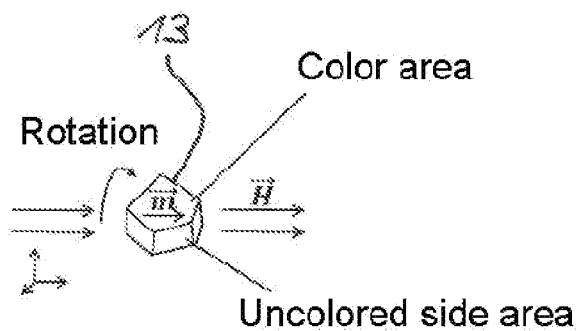
FIG. 6 a conventional platelet-shaped magnetic effect pigment according to the prior art, whose magnetic moment extends perpendicular to the normal vector of the thin films.

FIG. 6 shows a conventional platelet-shaped magnetic effect pigment 13 according to prior art whose magnetic moment extends perpendicular to the normal vector of the thin films. Such effect pigments 13 are commercially available under the trade name OVMI® from the company SICPA, have a platelet-shaped construction and are present in the form of a layer composite which includes two layers of optical effect layers, e.g. in each case a color-shifting layer system with absorber/dielectric/reflector construction, and a magnetic layer embedded in between. The optical effect layers each represent a color area. The side areas of the pigment 13 are more or less uncolored. The magnetization of the magnetic pigment 13 is referred to by the formula symbol "m". If a magnetic field with a field strength having the formula symbol "H" is applied, the pigments 13 are aligned such that their magnetization is parallel to the field vector, if possible (see FIG. 6). As a consequence, the magnetic pigments 13 can rotate about axes parallel to their magnetization "m". The use of such magnetic pigments 13, e.g. when printing a value document, thus leads to a substantially uniform alignment of the pigments 13 in one direction, while the alignment of the pigments 13 in another direction is substantially randomly distributed. Thus, when viewing a value document obtained in this way, it is not always a color area of the pigment 13 that points upwards in the direction of the viewer. This leads to a widening of the light reflection and to a decreased brilliance and sharpness of the optically variable effect.

Figure 5:
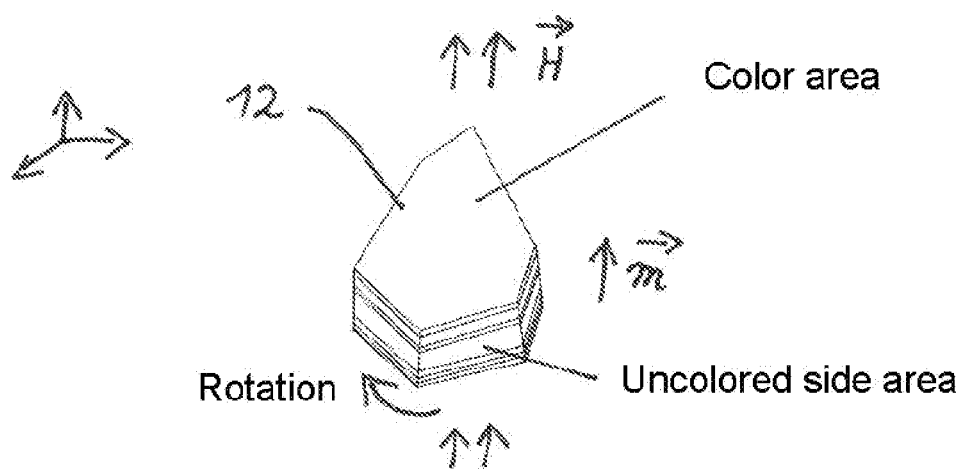
FIG. 5 an example of a platelet-shaped magnetic effect pigment according to the invention.

FIG. 5 shows an example of a platelet-shaped magnetic effect pigment 12 according to the invention, whose magnetic moment "m" is aligned perpendicular to the platelet plane. If a magnetic field with a field strength having the formula symbol "H" is applied, the pigments 12 are aligned such that their magnetization is parallel to the field vector, if possible. Just as with the magnetic effect pigments 12 known in the prior art, a degree of freedom remains: the platelets can rotate about an axis parallel to their magnetic moment without changing their potential energy in the magnetic field. In contrast to the magnetic pigments 13 known in the prior art, however, the rotation in the case of the pigments 12 according to the invention has no significant influence on the reflecting properties of the pigments 12. Consequently, the reflecting properties can be better controlled. In the case of the magnetic pigments 13 known in the prior art, the viewer sees a plurality of small pigments, each with a substantially random brightness. The security elements obtained in this way consequently have a granular or a, so to speak, "noisy" optical texture. In comparison, homogeneously glossy areas can be produced by means of the pigments 12 according to the invention. In this way, so-called micro-mirror bulge effects can be achieved, for example.

The platelet-shaped magnetic effect pigment 12 according to the invention, shown in FIG. 5, has a sandwich-like layer construction with a specific magnetic layer as a central layer, which is provided with an optical functional layer both on the front side and on the back side. In the present example, the two optical functional layers are identical and are each formed by an interference layer construction with a reflective layer (e.g. an Al layer), a dielectric layer (e.g. an $SiO_2$ layer) and an absorbent layer (e.g. a Cr layer). The effect pigment 12 thus has a symmetric layer construction with the layer sequence: absorbent layer-dielectric layer-reflective layer-magnetic layer-reflective layer-dielectric layer-absorbent layer.

Figure 1:
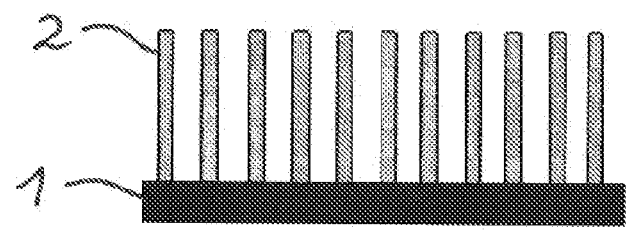
FIG. 1 a column-shaped nanostructure made of magnetic material produced above a substrate by means of glancing angle deposition (GLAD), with the columns being oriented perpendicular to the substrate plane.
Figure 2:
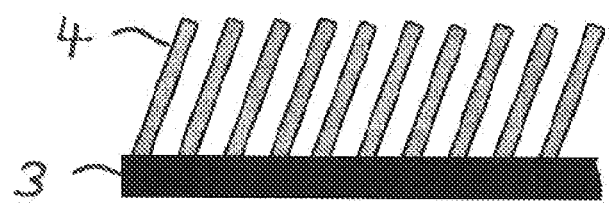
FIG. 2 a column-shaped nanostructure made of magnetic material produced above a substrate by means of glancing angle deposition (GLAD), with the columns being inclined towards to the substrate plane.
Figure 3:
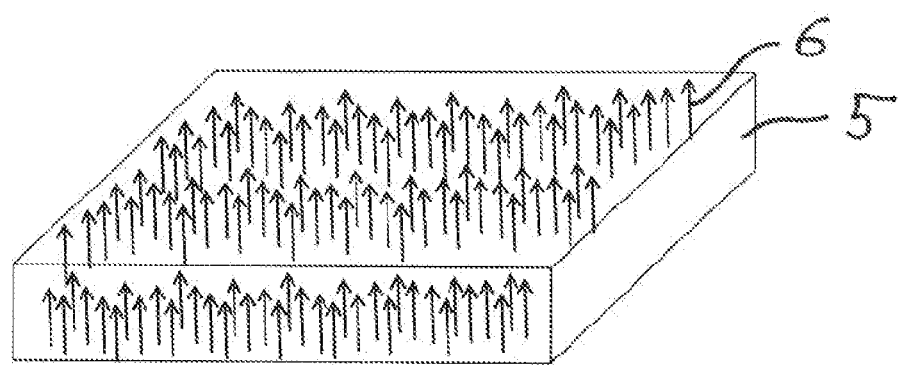
FIG. 3 an example of a magnetic layer of an effect pigment according to the invention.

With reference to FIGS. 1 to 4, the production of the platelet-shaped magnetic effect pigment 12 according to the invention is described below in accordance with FIG. 5. FIGS. 1 to 3 illustrate in particular the manufacture of the magnetic layer.

FIG. 1 shows a column-shaped nanostructure made of magnetic material produced above a substrate 1 by means of glancing angle deposition (GLAD), with the columns 2 being oriented perpendicular to the substrate plane. The magnetic material used is, e.g., $\alpha$-$Fe_2O_3$ (haematite).

The column-shaped nanostructure shown in FIG. 1, after detachment from the substrate, is provided as a magnetic layer 5 for producing the effect pigments according to the invention (see FIG. 3). The arrows 6 shown in FIG. 3 each illustrate the magnetic moment of the individual magnetic columns within the nanostructure.

Figure 4:
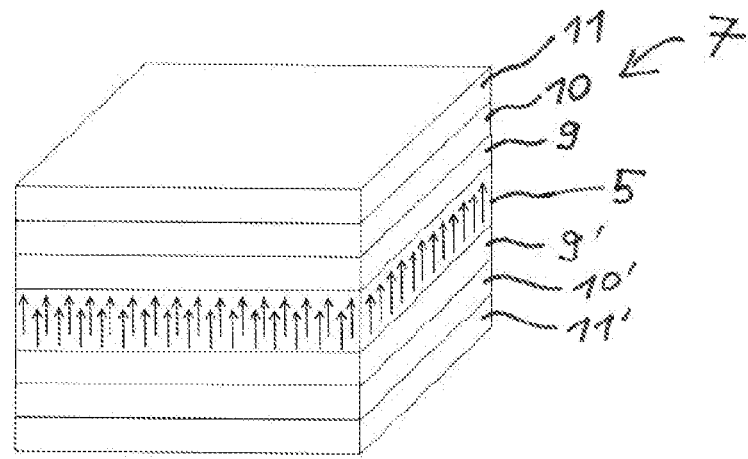
FIG. 4 an example of a layer construction (detail) starting from which platelet-shaped magnetic effect pigments according to the invention can be obtained by means of crushing.

The magnetic layer 5 obtained is provided, according to FIG. 4, both on the front side as well as on the back side by means of vapor deposition with respectively one color-tilting interference layer construction which has a reflective layer 9 (or 9'), a dielectric layer 10 (or 10') and an absorbent layer 11 (or 11'). FIG. 4 shows a section of the layer construction 7 obtained in this way, starting from which the platelet-shaped magnetic effect pigments 12 according to the invention can be obtained by means of crushing.

According to a modification of the above-described manufacture of an effect pigment according to the invention, the magnetic layer 5 shown in FIG. 3 is not based on the column-shaped nanostructure shown in FIG. 1, in which the magnetic columns 2 are oriented perpendicular to the substrate plane, but on the column-shaped nanostructure shown in FIG. 2, in which the magnetic columns 4 are inclined towards the plane of the substrate 3.

Furthermore, according to a further modification of the above embodiments, the column-shaped nanostructure of the magnetic material can be obtained using the oblique angle deposition (OAD) technique instead of the glancing angle deposition (GLAD) technique.

The invention claimed is:

1. A platelet-shaped magnetic effect pigment for use in a printing ink, comprising a layer construction with a magnetic layer and at least one optical functional layer,
    wherein the magnetic layer is based on a magnetic material having a column-shaped nanostructure and magnetic columns respectively have a largely uniform preferential magnetic direction deviating from a platelet plane.

2. The platelet-shaped magnetic effect pigment according to claim 1, wherein the largely uniform preferential magnetic direction of the magnetic columns is aligned substantially perpendicular to the platelet plane of the effect pigment.

3. The platelet-shaped magnetic effect pigment according to claim 1, wherein the largely uniform preferential magnetic direction of the magnetic columns is inclined towards the platelet plane with an angle of inclination, measured starting from the perpendicular to the platelet plane, in a region of 1° to 20°.

4. The platelet-shaped magnetic effect pigment according to claim 1, wherein the magnetic columns respectively have a size of less than 1000 nm.

5. The platelet-shaped magnetic effect pigment according to claim 1, wherein the largely uniform preferential magnetic direction of the magnetic columns is a uniaxial magnetic anisotropy.

6. The platelet-shaped magnetic effect pigment according to claim 5, wherein the material of the magnetic layer is selected from the group consisting of $BaFe_{12}O_{19}$, FePt, CoCrPt, CoPt, BiMn, $\alpha$-$Fe_2O_3$ and $Nd_2Fe_{14}B$, and the largely uniform preferential magnetic direction of the magnetic columns is a uniaxial magnetic crystal anisotropy, or
    wherein the material of the magnetic layer is selected from the group consisting of iron, cobalt, nickel and an alloy of one or several of the aforementioned elements, and the largely uniform preferential magnetic direction of the magnetic columns is a uniaxial magnetic shape anisotropy.

7. The platelet-shaped magnetic effect pigment according to claim 1, wherein the column-shaped nanostructure of the magnetic material is obtainable by means of a glancing angle deposition (GLAD) technique or an oblique angle deposition (OAD) technique.

8. The platelet-shaped magnetic effect pigment according to claim 1, wherein the optical functional layer is a metallic layer, a color layer obtainable by printing technology, an interference layer construction based on a reflective layer, a dielectric layer and an absorbent layer, or a combination of two or several of the aforementioned elements.

9. The platelet-shaped magnetic effect pigment according to claim 8, wherein the optical functional layer is an interference layer construction based on a reflective layer, a dielectric layer and an absorbent layer and the effect pigment has the following layer sequence: absorbent layer-dielectric layer-reflective layer-dielectric layer-absorbent layer-magnetic layer.

10. A method for manufacturing a platelet-shaped magnetic effect pigment according to claim 1, comprising:
    a) producing a magnetic layer on a basis of a magnetic material having a column-shaped nanostructure, the magnetic columns being formed with a largely uniform preferential magnetic direction deviating from a plane of the magnetic layer;
    b) producing a layer construction having the magnetic layer and at least one optical functional layer according to claim 1; and
    c) crushing the layer construction obtained in step b) into the individual platelet-shaped magnetic effect pigments.

11. A method for manufacturing a value document, comprising
    printing a value document substrate with a first printing ink containing platelet-shaped magnetic effect pigments according to claim 1 in a first region;
    aligning the platelet-shaped magnetic effect pigments in the first printing ink respectively printed in the first region by means of an external magnetic field;
    curing the first printing ink printed in the first region.

12. The method according to claim 11, wherein the method further comprises:
    printing the value document substrate with a second printing ink containing second platelet-shaped magnetic effect pigments in a second region adjacent to the first region, the second effect pigments being visually different from the first effect pigments;
    aligning the platelet-shaped magnetic effect pigments in the second printing ink printed in the second region by means of an external magnetic field; and
    curing the second printing ink printed in the second region.

13. The method according to claim 11, wherein the method further comprises:
    printing the value document substrate with a second printing ink containing conventional platelet-shaped magnetic effect pigments in a second region adjacent to the first region, the conventional platelet-shaped magnetic effect pigments having a preferential magnetic direction extending along the platelet plane;
    aligning the platelet-shaped magnetic effect pigments in the second printing ink printed in the second region by means of an external magnetic field; and curing the second printing ink printed in the second region so that the first and second regions have a clearly distinguishable appearance due to a different alignment of the two types of effect pigments.

14. A value document obtainable by the method according to claim 11.

15. The value document according to claim 14, wherein the value document is a bank note or an identification document.

16. A printing ink comprising platelet-shaped magnetic effect pigments according to claim 1.

17. The printing ink according to claim 16, wherein the printing ink further comprises a binding agent including a UV-curing binding agent, a binding agent curing by means of electron beams or a heat-curing binding agent.

18. The platelet-shaped magnetic effect pigment according to claim 1, wherein the effect pigment has a sandwich-like layer construction and the magnetic layer as a central layer is provided both on the front side and on the back side with respectively one optical functional layer,
wherein the two optical functional layers independently from each other are selected from a reflective metallic layer, a color layer obtainable by printing technology, an interference layer construction based on a reflective layer, a dielectric layer and an absorbent layer, or a combination of two or more of the aforementioned elements.

19. The platelet-shaped magnetic effect pigment according to claim 1, wherein the effect pigment has an asymmetric layer construction with two optical functional layers differing from each other, which respectively are an interference layer construction based on a reflective layer, a dielectric layer and an absorbent layer and differ from each other with regard to the material or a layer thickness of the dielectric layer, and the effect pigment has the following layer sequence: absorbent layer-dielectric layer-reflective layer-magnetic layer-reflective layer-dielectric layer-absorbent layer.

20. The platelet-shaped magnetic effect pigment according to claim 19, wherein the effect pigment has an asymmetric layer construction,
wherein the magnetic layer, on the front side, is provided with an interference layer construction based on a reflective layer, a dielectric layer and an absorbent layer and the magnetic layer, on the back side, is provided with a reflective metallic layer, so that the effect pigment has the following layer sequence: absorbent layer-dielectric layer-reflective layer-magnetic layer-reflective metallic layer.

21. The platelet-shaped magnetic effect pigment according to claim 18, wherein the effect pigment has a symmetric layer construction with two identical optical functional layers.

22. The platelet-shaped magnetic effect pigment according to claim 21, wherein the effect pigment has a symmetric layer construction,
wherein the magnetic layer as a central layer is provided both on the front side and on the back side with respectively one optical functional layer, and
wherein the two optical functional layers respectively are an interference layer construction based on a reflective layer, a dielectric layer and an absorbent layer, and the effect pigment has the following layer sequence: absorbent layer-dielectric layer-reflective layer-magnetic layer-reflective layer-dielectric layer-absorbent layer.

* * * * *